United States Patent [19]
Forgette et al.

[11] Patent Number: 5,818,625
[45] Date of Patent: Oct. 6, 1998

[54] ELECTROCHROMIC REARVIEW MIRROR INCORPORATING A THIRD SURFACE METAL REFLECTOR

[75] Inventors: Jeffrey A. Forgette, Wyoming; Harlan J. Byker, Holland; William L. Tonar, Holland; Frederick T. Bauer, Holland, all of Mich.

[73] Assignee: Gentex Corporation, Zeeland, Mich.

[21] Appl. No.: 832,587

[22] Filed: Apr. 2, 1997

[51] Int. Cl.[6] .................................................. G02F 1/153
[52] U.S. Cl. ...................................... 359/267; 359/273
[58] Field of Search ..................................... 359/267, 273

[56] References Cited

U.S. PATENT DOCUMENTS

| | | | |
|---|---|---|---|
| 3,280,701 | 10/1966 | Donnelly et al. | 88/77 |
| 4,902,108 | 2/1990 | Byker | 350/357 |
| 5,066,112 | 11/1991 | Lynam et al. | 359/267 |
| 5,069,535 | 12/1991 | Baucke et al. | 359/273 |
| 5,076,673 | 12/1991 | Lynam et al. | 359/271 |
| 5,115,346 | 5/1992 | Lynam | 359/604 |
| 5,253,109 | 10/1993 | O'Farrell et al. | 359/604 |

FOREIGN PATENT DOCUMENTS

| | | | |
|---|---|---|---|
| 0 728 618 A2 | 8/1996 | European Pat. Off. | B60R 1/08 |
| WO 95/30495 | 11/1995 | WIPO | B05D 5/06 |

Primary Examiner—Georgia V. Epps
Assistant Examiner—Dawn-Marie Bey
Attorney, Agent, or Firm—Brian J. Rees

[57] ABSTRACT

An electrochromic variable reflectance mirror for a vehicle includes a reflector/electrode on the third surface of the mirror. This reflector/electrode forms an integral electrode in contact with the electrochromic media, and may be a single layer of a highly reflective material or may comprise a series of coatings. When a series of coatings is used for the reflector/electrode, there should be a base coating which bonds to the glass surface and resists any adverse interaction, e.g., corrosive action, with the constituents comprising the electrochromic media, an optional intermediate layer (or layers) which bonds well to the base coating and resists any adverse interaction with the electrochromic media, and at least one highly reflective layer which directly contacts the electrochromic media and which is chosen primarily for its high reflectance, stable behavior as an electrode, resistance to adverse interaction with the materials of the electrochromic media, resistance to atmospheric corrosion, resistance to electrical contact corrosion, the ability to adhere to the base or intermediate layer(s) (if present) and to the epoxy seal, and ease of cleaning. If a base layer is deposited it preferably covers the entire third surface; however, when this is done the highly reflective layer may optionally only coat the central portion of the third surface and not the perimeter edge portion. The third surface reflector/electrode provides of improved electrical interconnection techniques used to impart a voltage drive potential to a transparent conductor on the mirror's second surface.

36 Claims, 3 Drawing Sheets

Prior Art

ELECTROCHROMIC REARVIEW MIRROR INCORPORATING A THIRD SURFACE METAL REFLECTOR

BACKGROUND OF THE INVENTION

This invention relates to electrochromic rearview mirrors for motor vehicles and, more particularly, to improved electrochromic rearview mirrors incorporating third surface reflector/electrode in contact with at least one solution-phase electrochromic material.

Heretofore, various rearview mirrors for motor vehicles have been proposed which change from the full reflectance mode (day) to the partial reflectance mode(s) (night) for glare-protection purposes from light emanating from the headlights of vehicles approaching from the rear. Among such devices are those wherein the transmittance is varied by thermochromic, photochromic, or electro-optic (e.g., liquid crystal, dipolar suspension, electrophoretic, electrochromic, etc.) means and where the variable transmittance characteristic affects electromagnetic radiation that is at least partly in the visible spectrum (wavelengths from about 3800 Å to about 7800 Å). Devices of reversibly variable transmittance to electromagnetic radiation have been proposed as the variable transmittance element in variable transmittance light-filters, variable reflectance mirrors, and display devices which employ such light-filters or mirrors in conveying information. These variable transmittance light filters have included windows.

Devices of reversibly variable transmittance to electromagnetic radiation, wherein the transmittance is altered by electrochromic means, are described, for example, by Chang, "Electrochromic and Electrochemichromic Materials and Phenomena," in *Non-emissive Electrooptic Displays*, A. Kmetz and K. von Willisen, eds. Plenum Press, New York, N.Y. 1976, pp. 155–196 (1976) and in various parts of *Eletrochromism*, P. M. S. Monk, R. J. Mortimer, D. R. Rosseinsky, VCH Publishers, Inc., New York, N.Y. (1995). Numerous electrochromic devices are known in the art. See, e.g., Manos, U.S. Pat. No. 3,451,741; Bredfeldt et al., U.S. Pat. No. 4,090,358; Clecak et al., U.S. Pat. No. 4,139,276; Kissa et al., U.S. Pat. No. 3,453,038; Rogers, U.S. Pat. Nos. 3,652,149, 3,774,988 and 3,873,185; and Jones et al., U.S. Pat. Nos. 3,282,157, 3,282,158, 3,282,160 and 3,283,656.

In addition to these devices there are commercially available electrochromic devices and associated circuitry, such as those disclosed in U.S. Pat. No. 4,902,108, entitled "Single-Compartment, Self-Erasing, Solution-Phase Electrochromic Devices Solutions for Use Therein, and Uses Thereof", issued Feb. 20, 1990 to H. J. Byker; Canadian Patent No. 1,300,945, entitled "Automatic Rearview Mirror System for Automotive Vehicles", issued May 19, 1992 to J. H. Bechtel et al.; U.S. Pat. No. 5,128,799, entitled "Variable Reflectance Motor Vehicle Mirror", issued Jul. 7, 1992 to H. J. Byker; U.S. Pat. No. 5,202,787, entitled "Electro-Optic Device", issued Apr. 13, 1993 to H. J. Byker et al.; U.S. Pat. No. 5,204,778, entitled "Control System For Automatic Rearview Mirrors", issued Apr. 20, 1993 to J. H. Bechtel; U.S. Pat. No. 5,278,693, entitled "Tinted Solution-Phase Electrochromic Mirrors", issued Jan. 11, 1994 to D. A. Theiste et al.; U.S. Pat. No. 5,280,380, entitled "UV-Stabilized Compositions and Methods", issued Jan. 18, 1994 to H. J. Byker; U.S. Pat. No. 5,282,077, entitled "Variable Reflectance Mirror", issued Jan. 25, 1994 to H. J. Byker; U.S. Pat. No. 5,294,376, entitled "Bipyridinium Salt Solutions", issued Mar. 15, 1994 to H. J. Byker; U.S. Pat. No. 5,336,448, entitled "Electrochromic Devices with Bipyridinium Salt Solutions", issued Aug. 9, 1994 to H. J. Byker; U.S. Pat. No. 5,434,407, entitled "Automatic Rearview Mirror Incorporating Light Pipe", issued Jan. 18, 1995 to F. T. Bauer et al.; U.S. Pat. No. 5,448,397, entitled "Outside Automatic Rearview Mirror for Automotive Vehicles", issued Sep. 5, 1995 to W. L. Tonar; and U.S. Pat. No. 5,451,822, entitled "Electronic Control System", issued Sep. 19, 1995 to J. H. Bechtel et al. Each of these patents is commonly assigned with the present invention and the disclosures of each, including the references contained therein, are hereby incorporated herein in their entirety by reference. Such electrochromic devices may be utilized in a fully integrated inside/outside rearview mirror system or as separate inside or outside rearview mirror systems.

Figure 1:
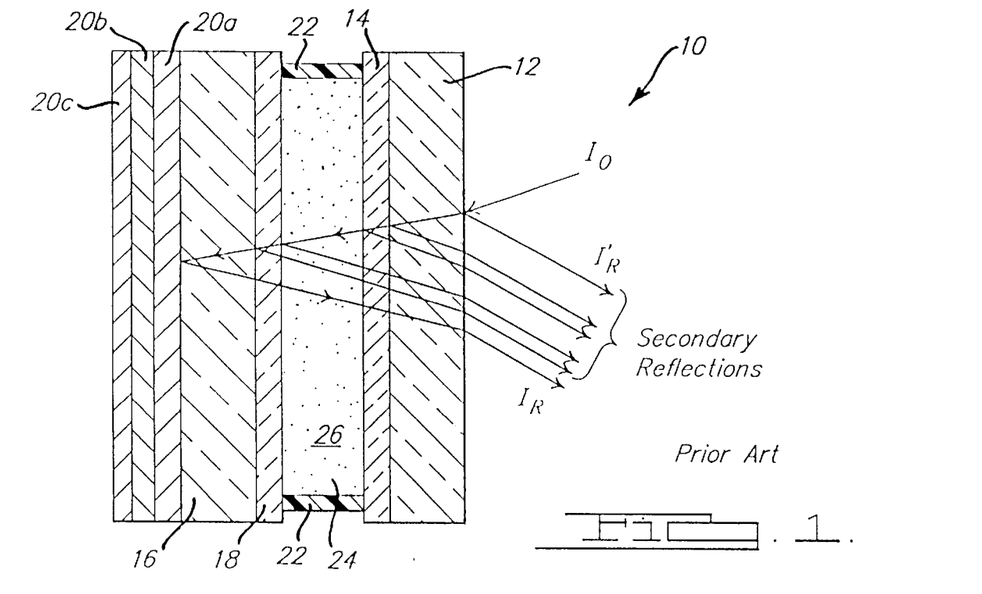
FIG. 1 is an enlarged cross-sectional view of a prior art electrochromic mirror assembly.

FIG. 1 shows a typical electrochromic mirror device 10, having front and rear planar elements 12 and 16, respectively. A transparent conductive coating 14 is placed on the rear face of the front element 12, and another transparent conductive coating 18 is placed on the front face of rear element 16. A reflector (20a, 20b and 20c), typically comprising a silver metal layer 20a covered by a protective copper metal layer 20b, and one or more layers of protective paint 20c, is disposed on the rear face of the rear element 16. For clarity of description of such a structure, the front surface of the front glass element is sometimes referred to as the first surface, and the inside surface of the front glass element is sometimes referred to as the second surface. The inside surface of the rear glass element is sometimes referred to as the third surface, and the back surface of the rear glass element is sometimes referred to as the fourth surface. The front and rear elements are held in a parallel and spaced-apart relationship by seal 22, thereby creating a chamber 26. The electrochromic medium 24 is contained in space 26. The electrochromic medium 24 is in direct contact with transparent electrode layers 14 and 18, through which passes electromagnetic radiation whose intensity is reversibly modulated in the device by a variable voltage or potential applied to electrode layers 14 and 18 through clip contacts and an electronic circuit (not shown).

The electrochromic medium 24 placed in space 26 may include surface-confined, electrodeposition type or solution-phase type electrochromic materials and combinations thereof. In an all solution-phase medium, the electrochemical properties of the solvent, optional inert electrolyte, anodic materials, cathodic materials, and any other components that might be present in the solution are preferably such that no significant electrochemical or other changes occur at a potential difference which oxidizes anodic material and reduces the cathodic material other than the electrochemical oxidation of the anodic material, electrochemical reduction of the cathodic material and the self-erasing reaction between the oxidized form of the anodic material and the reduced form of the cathodic material.

In most cases, when there is no electrical potential difference between transparent conductors 14 and 18, the electrochromic medium 24 in space 26 is essentially colorless or nearly colorless, and incoming light ($I_o$) enters through front element 12, passes through transparent coating 14, electrochromic containing chamber 26, transparent coating 18, rear element 16 and reflects off layer 20a and travels back through the device and out front element 12. Typically, the magnitude of the reflected image ($I_R$) with no electrical potential difference is about 45 percent to about 85 percent of the incident light intensity ($I_o$). The exact value depends on many variables outlined below, such as, for example, the residual reflection ($I'_R$) from the front face of the front element, as well as secondary reflections from the interfaces between: the front element 12 and the front transparent electrode 14; the front transparent electrode 14 and the electrochromic medium 24; the electrochromic medium 24 and the second transparent electrode 18; and the second transparent electrode 18 and the rear element 16. These reflections are well known in the art and are due to the difference in refractive indices between one material and another as the light crosses the interface between the two. If the front element and the back element are not parallel, then the residual reflectance ($I'_R$) or other secondary reflections will not superimpose with the reflected image ($I_R$) from mirror surface 20a, and a double image will appear (where an observer would see what appears to be double (or triple) the number of objects actually present in the reflected image).

There are minimum requirements for the magnitude of the reflected image depending in whether the electrochromic mirrors are placed on the inside or the outside of the vehicle. For example, according to current requirements from most automobile manufacturers, inside mirrors must have a high end reflectivity of at least 70 percent and outside mirrors must have a high end reflectivity of at least 50 percent.

Electrode layers 14 and 18 are connected to electronic circuitry which is effective to electrically energize the electrochromic medium, such that when a potential is applied across the transparent conductors 14 and 18, electrochromic medium in space 26 darkens such that incident light ($I_o$) is attenuated as the light passes toward the reflector 20a and as it passes back through after being reflected. By adjusting the potential difference between the transparent electrodes, such a device can function as a "gray-scale" device, with continuously variable transmittance over a wide range. For solution-phase electrochromic systems, when the potential between the electrodes is removed or returned to zero, the device spontaneously returns to the same, zero-potential, equilibrium color and transmittance as the device had before the potential was applied. Other electrochromic materials are available for making electrochromic devices. For example, the electrochromic medium may include electrochromic materials that are solid metal oxides, redox active polymers and hybrid combinations of solution-phase and solid metal oxides or redox active polymers; however, the above-described solution-phase design is typical of most of the electrochromic devices presently in use.

Even before a fourth surface reflector electrochromic mirror was commercially available, various groups researching electrochromic devices had discussed moving the reflector from the fourth surface to the third surface. Such a design has advantages in that it should, theoretically, be easier to manufacture because there are fewer layers to build into a device, i.e., the third surface transparent electrode is not necessary when there is a third surface reflector/electrode. Although this concept was described as early as 1966, no group had commercial success because of the exacting criteria demanded from a workable auto-dimming mirror incorporating a third surface reflector. U.S. Pat. No. 3,280, 701, entitled "Optically Variable One-Way Mirror", issued Oct. 25, 1966 to J. F. Donnelly et al has one of the earliest discussions of a third surface reflector for a system using a pH-induced color change to attenuate light.

U.S. Pat. No. 5,066,112, entitled "Perimeter Coated, Electro-Optic Mirror", issued Nov. 19, 1991, to N. R. Lynam et al., teaches an electro-optic mirror with a conductive coating applied to the perimeter of the front and rear glass elements for concealing the seal. Although a third surface reflector is discussed therein, the materials listed as being useful as a third surface reflector suffer from one or more of the following deficiencies: not having sufficient reflectivity for use as an inside mirror, or not being stable when in contact with a solution-phase electrochromic medium containing at least one solution-phase electrochromic material.

Others have broached the topic of a reflector/electrode disposed in the middle of an all solid state-type devices. For example U.S. Pat. Nos. 4,762,401; 4,973,141; and 5,069,535 to Baucke et al. teach an electrochromic mirror having the following structure: a glass element; a transparent (ITO) electrode; a tungsten oxide electrochromic layer; a solid ion-conducting layer; a single layer hydrogen ion-permeable reflector; a solid ion conducting layer; a hydrogen ion storage layer; a catalytic layer; a rear metallic layer; and a back element (representing the conventional third and fourth surface). The reflector is not deposited on the third surface and is not directly in contact with electrochromic materials, certainly not at least one solution-phase electrochromic material and associated medium.

Consequently, it is desirable to provide an improved high reflectivity electrochromic rearview mirror having a third surface reflector/electrode in contact a solution-phase electrochromic medium containing at least one electrochromic material.

OBJECTS OF THE INVENTION

Accordingly, a primary object of the present invention is to provide an improved, robust, low cost dimmable rearview mirror incorporating a high reflectivity third surface reflector/electrode for motor vehicles, which mirror is capable of operating in harsh environments over wide variations in temperature, humidity, vibration, atmospheric corrosion, salt spray, electronic disturbances, and sand and grit, and which is relatively economical and reliable to consistently manufacture and assemble, and is durable, efficient and reliable in operation.

Another object of the present invention is to provide an improved dimmable rearview mirror for motor vehicles wherein excellent speed of reflectance change, excellent high end reflectance, good uniformity of reflectance change across the surface area of the mirror, neutral color or appearance in the high reflectance state, continually variable reflectance and good low end reflectance are obtained.

Another object of the present invention is to provide improved high conductance contact or buss bars for the second surface transparent conductive electrode by using a portion of the third surface reflector/electrode and a conductive seal or strip to make electrical contact to the transparent conductive electrode on the second surface.

SUMMARY OF THE INVENTION

The above and other objects, which will become apparent from the specification as a whole, including the drawings, are accomplished in accordance with the present invention by incorporating a reflector/electrode on the inside (third) surface of a dimming portion of the rearview mirror. This reflector/electrode forms an integral electrode in contact with at least one solution-phase electrochromic material, and may be a single layer of a highly reflective silver alloy or may comprise a series of coatings where the outer coating is a highly reflective silver alloy. When a series of coatings is used for the reflector/electrode, there should be a base coating which bonds to the glass surface and resists any adverse interaction, e.g., corrosive action, with any constituents of the electrochromic medium, an optional intermediate layer (or layers) which bonds well to the base coating and resists any adverse interaction with the electrochromic medium, and at least one highly reflective silver alloy which directly contacts the electrochromic medium and which is chosen primarily for its adequate bond to the peripheral seal, its high reflectance, good shelf life, stable behavior as an electrode, resistance to adverse interaction with the electrochromic medium, resistance to atmospheric corrosion, resistance to electrical contact corrosion, the ability to adhere to the base or intermediate layer(s), if present. If a single layer of highly reflective silver alloy is utilized, it must also meet these operational criteria.

In another embodiment of the present invention, when a very thin over-coating is placed over the highly reflective layer, then the highly reflective layer may be silver metal or a silver alloy.

In yet another embodiment of the present invention, the third surface reflector/electrode includes at least one base layer that is disposed over the entire third surface of the electrochromic mirror. A highly reflective layer is disposed over the central portion of the base layer(s) and not over the perimeter edge portion where the seal will be placed. Optionally, one or more intermediate layers may be disposed between the base and reflective layers, and may be placed over the entire third surface or may be placed over the central portion or both (if there is more than one intermediate layer).

The third surface reflector of the present invention may additionally provide for significant improvement of the electrical interconnection techniques used to impart a voltage or drive potential to the transparent conductor on the second surface of the electrochromic mirror. This is accomplished both by providing improved contact stability between the contacts, such as clips, and the reflector layer and by providing unique and advantageous buss bar configurations.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings, where like numerals represent like components, in which:

FIG. 5a is an enlarged cross-sectional view of an electrochromic mirror having an improved arrangement for applying a drive potential to the transparent conductor on the second surface of the mirror;

FIG. 5b is an enlarged top view of the third surface reflector of FIG 5a; and

DETAILED DESCRIPTION OF THE INVENTION

Figure 2:
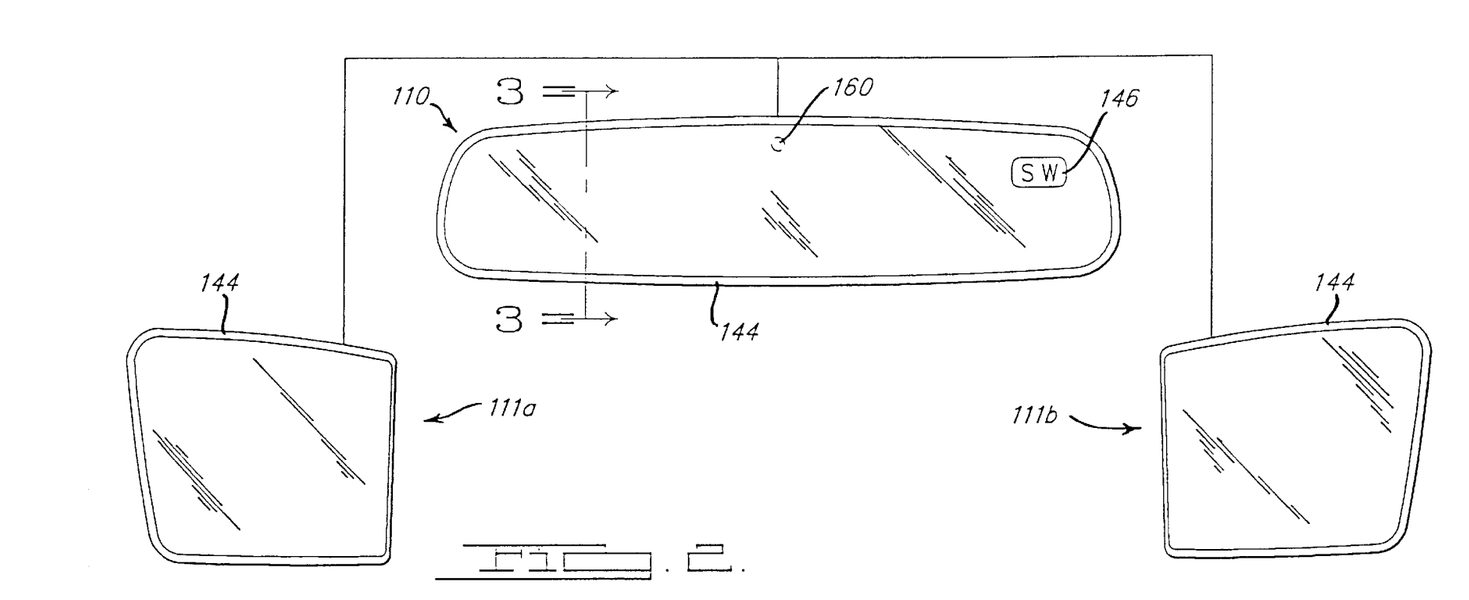
FIG. 2 is a front elevational view schematically illustrating an inside/outside electrochromic rearview mirror system for motor vehicles where the inside and outside mirrors incorporate the mirror assembly of the present invention.

FIG. 2 shows a front elevational view schematically illustrating an inside mirror assembly 110 and two outside rearview mirror assemblies 111a and 111b for the driver-side and passenger-side, respectively, all of which are adapted to be installed on a motor vehicle in a conventional manner and where the mirrors face the rear of the vehicle and can be viewed by the driver of the vehicle to provide a rearward view. Inside mirror assembly 110, and outside rearview mirror assemblies 111a and 111b may incorporate light-sensing electronic circuitry of the type illustrated and described in the above-referenced Canadian Patent No. 1,300,945; U.S. Pat. No. 5,204,778; or U.S. Pat. No. 5,451,822, and other circuits capable of sensing glare and ambient light and supplying a drive voltage to the electrochromic element. Mirror assemblies 110, 111a and 111b are essentially identical in that like numbers identify components of the inside and outside mirrors. These components may be slightly different in configuration but function in substantially the same manner and obtain substantially the same results as similarly numbered components. For example, the shape of the front glass element of inside mirror 110 is generally longer and narrower than outside mirrors 111a and 111b. There are also some different performance standards placed on inside mirror 110 compared with outside mirrors 111a and 111b. For example, inside mirror 110 generally, when fully cleared, should have a reflectance value of about 70 percent to about 85 percent or higher whereas the outside mirrors often have a reflectance of about 50 percent to about 65 percent. Also, in the United States (as supplied by the automobile manufacturers), the passenger-side mirror 111b typically has a spherically bent, or convex shape, whereas the driver-side mirror 111a, and inside mirror 110 presently must be flat. In Europe the driver-side mirror 111a is commonly flat or aspheric, whereas the passenger-side mirror 111b has a convex shape. In Japan both outside mirrors have a convex shape. The following description is generally applicable to all mirror assemblies of the present invention.

Figure 3:
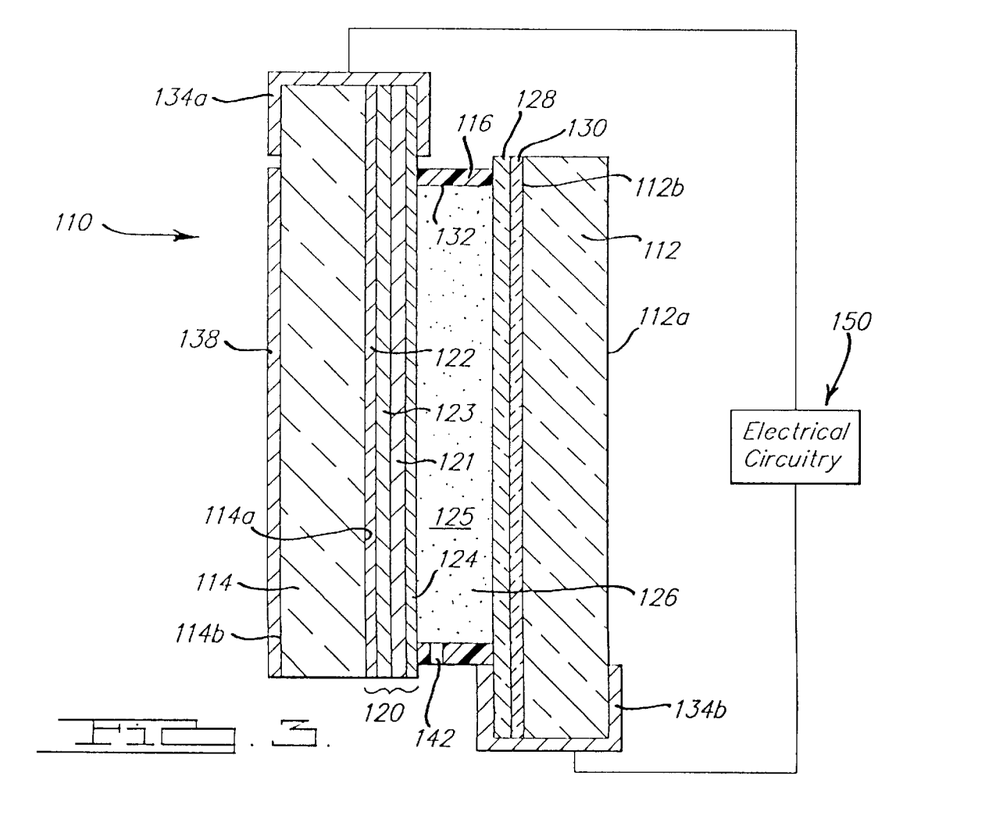
FIG. 3 is an enlarged cross-sectional view of the inside electrochromic rearview mirror incorporating a third surface reflector/electrode illustrated in FIG. 2, taken on the line 2-2' thereof.
Figure 3A:
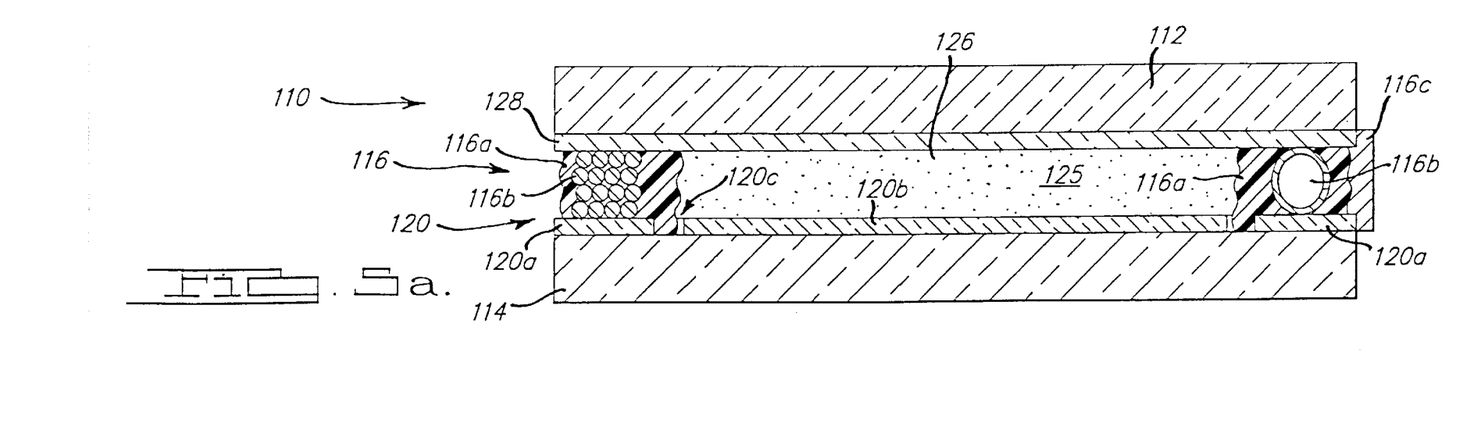

FIG. 3 shows a cross-sectional view of mirror assembly 110 having a front transparent element 112 having a front surface 112a and a rear surface 112b, and a rear element 114 having a front surface 114a and a rear surface 114b. For clarity of description of such a structure, the following designations will be used hereinafter. The front surface 112a of the front glass element will be referred to as the first surface and the back surface 112b of the front glass element as the second surface. The front surface 114a of the rear glass element will be referred to as the third surface, and the back surface 114b of the rear glass element as the fourth surface. Chamber 125 is defined by a layer of transparent conductor 128 (disposed on second surface 112b), a reflector/electrode 120 (disposed on third surface 114a), and an inner circumferential wall 132 of sealing member 116.

Front transparent element 112 may be any material which is transparent and has sufficient strength to be able to operate in the conditions, e.g., varying temperatures and pressures, commonly found in the automotive environment. Front element 112 may comprise any type of borosilicate glass, soda lime glass, float glass or any other material, such as, for example, a polymer or plastic, that is transparent in the visible region of the electromagnetic spectrum. Front element 112 is preferably a sheet of glass. Rear element must meet the operational conditions outlined above, except that it does not need to be transparent, and therefore may comprise polymers, metals, glass, ceramics, and preferably is a sheet of glass.

The coatings of the third surface 114a are sealably bonded to the coatings on the second surface 112b in a spaced-apart and parallel relationship by a seal member 116 disposed near the outer perimeter of both second surface 112b and third surface 114a. Seal member 116 may be any material that is capable of adhesively bonding the coatings on the second surface 112b to the coatings on the third surface 114a to seal the perimeter such that electrochromic material 126 does not leak from chamber 125. Optionally, the layer of transparent conductive coating 128 and the layer of reflector/electrode 120 may be removed over a portion where the seal member is disposed (not the entire portion, otherwise the drive potential could not be applied to the two coatings). In such a case, seal member 116 must bond well to glass.

The performance requirements for a perimeter seal member 116 used in an electrochromic device are similar to those for a perimeter seal used in a liquid crystal device (LCD) which are well known in the art. The seal must have good adhesion to glass, metals and metal oxides, must have low permeabilities for oxygen, moisture vapor and other detrimental vapors and gases, and must not interact with or poison the electrochromic or liquid crystal material it is meant to contain and protect. The perimeter seal can be applied by means commonly used in the LCD industry such as by silk-screening or dispensing. Totally hermetic seals such as those made with glass frit or solder glass can be used, but the high temperatures involved in processing (usually near 450-degrees Centigrade) this type of seal can cause numerous problems such as glass substrate warpage, changes in the properties of transparent conductive electrode and oxidation or degradation of the reflector. Because of their lower processing temperatures, thermoplastic, thermosetting or UV curing organic sealing resins are preferred. Such organic resin sealing systems for LCD's are described in U.S. Pat. No. 4,297,401, 4,418,102, 4,695,490, 5,596,023 and 5,596,024. Because of their excellent adhesion to glass, low oxygen permeability and good solvent resistance, epoxy based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter seal member 116 include but are not limited to: "EPON RESIN" 813, 825, 826, 828, 830, 834, 862, 1001F, 1002F, 2012, DPS-155, 164, 1031, 1074, 58005, 58006, 58034, 58901, 871, 872 and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510 and PT 810 available from Ciba Geigy, Hawthorne, N.Y.; "D.E.R." 331, 317, 361, 383, 661, 662, 667, 732, 736, "D.E.N."431, 438, 439 and 444 available from Dow Chemical Co., Midland, Mich. Suitable epoxy curing agents include V-15, V-25 and V-40 polyamides from Shell Chemical Co.; "AJICURE" PN-23, PN-34 and VDH available from Ajinomoto Co., Tokyo, Japan; "CUREZOL" AMZ, 2MZ, 2E4MZ, C11Z, C17Z, 2PZ, 2IZ and 2P4MZ available from Shikoku Fine Chemicals, Tokyo, Japan; "ERISYS" DDA or DDA accelerated with U-405, 24EMI, U-410 and U-415 available from CVC Specialty Chemicals, Maple Shade, N.J.; "AMICURE" PACM, 352, CG, CG-325 and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, EH-5 available from Cabot Corporation, Tuscola, Ill.; "AEROSIL" R972, R974, R805, R812, R812 S, R202, US204 and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, TRANSLINK 555 available from Engelhard Corporation, Edison, N.J. Suitable silica fillers are SILCRON G-130, G-300, G-100-T and G-100 available from SCM Chemicals, Baltimore, Md. Suitable silane coupling agents to improve the seal's hydrolytic stability are Z-6020, Z-6030, Z-6032, Z-6040, Z-6075 and Z-6076 available from Dow Corning Corporation, Midland, Mich. Suitable precision glass microbead spacers are available in an assortment of sizes from Duke Scientific, Palo Alto, Calif.

The layer of a transparent electrically conductive material 128 is deposited on the second surface 112b to act as an electrode. Transparent conductive material 128 may be any material which bonds well to front element 112, is resistant to corrosion to any materials within the electrochromic device, resistant to corrosion by the atmosphere, has minimal diffuse or specular reflectance, high light transmission, near neutral coloration and good electrical conductance. Transparent conductive material 128 may be fluorine doped tin oxide, tin doped indium oxide (ITO), ITO/metal/ITO (IMI) as disclosed in "Transparent Conductive Multilayer-Systems for FPD Applications", by J. Stollenwerk, B. Ocker, K. H. Kretschmer of LEYBOLD AG, Alzenau, Germany, and the materials described in above-referenced U.S. Pat. No. 5,202,787, such as TEC 20 or TEC 15, available from Libbey Owens-Ford Co. of Toledo, Ohio. Generally, the conductance of transparent conductive material 128 will depend on its thickness and composition. IMI generally has superior conductivity compared with the other materials. IMI is, however, more difficult and expensive to manufacture and may be useful when high conductance is necessary. The thickness of the various layers in the IMI structure may vary but generally the thickness of the first ITO layer ranges from about 10 Å to about 200 Å the metal ranges from about 10 Å to about 200 Å and the second layer of ITO ranges from about 10 Å to about 200 Å. If desired, an optional layer or layers of a color suppression material 130 may be deposited between transparent conductive material 128 and the second surface 112b to suppress the reflection of any unwanted portions of the electromagnetic spectrum.

In accordance with the present invention, a combination reflector/electrode 120 is disposed on third surface 114a. Reflector/electrode 120 comprises at least one layer of a highly reflective material 121 which serves as a mirror reflectance layer and also forms an integral electrode in contact with and in a chemically and electrochemically stable relationship with any constituents in an electrochromic medium. As stated above, the conventional method of building electrochromic devices was to incorporate a transparent conductive material on the third surface as an electrode, and place a reflector on the fourth surface. By combining the "reflector" and "electrode" and placing both on the third surface several unexpected advantages arise which not only make the device manufacture less complex, but also allow the device to operate with higher performance. The following will outline the exemplary advantages of the combined reflector/electrode of the present invention.

First, the combined reflector/electrode 120 on the third surface generally has higher conductance than a conventional transparent electrode and previously used reflector/electrodes which will allow greater design flexibility. One can either change the composition of the transparent conductive electrode on the second surface to one that has lower conductance (being cheaper and easier to produce and manufacture) while maintaining coloration speeds similar to that obtainable with a fourth surface reflector device, while at the same time decreasing substantially the overall cost and time to produce the electrochromic device. If, however, performance of a particular design is of utmost importance, a moderate to high conductance transparent electrode can be used on the second surface, such as, for example, ITO, IMI, etc. The combination of a high conductance reflector/electrode on the third surface and a high conductance transparent electrode on the second surface will not only produce an electrochromic device with more even overall coloration, but will also allow for increased speed of coloration and clearing. Furthermore, in fourth surface reflector mirror assemblies there are two transparent electrodes with relatively low conductance and in previously used third surface reflector mirrors there is a transparent electrode and a reflector/electrode with relatively low conductance and, as such, a long buss bar on the front and rear element to bring current in and out is necessary to ensure adequate coloring speed. The third surface reflector/electrode of the present invention has a higher conductance and therefore has a very even voltage or potential distribution across the conductive surface, even with a small or irregular contact area. Thus the present invention provides greater design flexibility by allowing the electrical contact for the third surface electrode to be very small while still maintaining adequate coloring speed.

Second, a third surface reflector/electrode helps improve the image being viewed through the mirror. FIG. 1 shows how light travels through a conventional fourth surface reflector device. In the fourth surface reflector the light travels through: the first glass element; the transparent conductive electrode on the second surface; the electrochromic media; the transparent conductive electrode on the third surface; and the second glass element, before being reflected by the fourth surface reflector. Both transparent conductive electrodes exhibit highly specular transmittance but also possess diffuse transmittance and reflective components, whereas the reflective layer utilized in any electrochromic mirror is chosen primarily for its specular reflectance. By diffuse reflectance or transmittance component we mean a material which reflects or transmits a portion of any light impinging on it according to Lambert's law whereby the light rays are spread-about or scattered. By specular reflectance or transmittance component we mean a material which reflects or transmits light impinging on it according to Snell's laws of reflection or refraction. In practical terms, diffuse reflectors and transmitters tends to slightly blur images, whereas specular reflectors show a crisp, clear image. Therefore, light traveling through a mirror having a device with a fourth surface reflector has two partial diffuse reflectors (on the second and third surface) which tend to blur the image, and a device with a third surface reflector/electrode of the present invention only has one diffuse reflector (on the second surface).

Additionally, because the transparent electrodes act as partial diffuse transmitters, and the farther away the diffuse transmitter is from the reflecting surface, the more severe the blurring becomes, a mirror with a fourth surface reflector appears significantly more hazy than a mirror with a third surface reflector. For example, in the fourth surface reflector shown in FIG. 1, the diffuse transmitter on the second surface is separated from the reflector by the electrochromic material, the second conductive electrode and the second glass element. The diffuse transmitter on the third surface is separated from the reflector by the second glass element. By incorporating a combined reflector/electrode on the third surface in accordance with the present invention, one of the diffuse transmitters is removed and the distance between the reflector and the remaining diffuse transmitter is closer by the thickness of the rear glass element. Therefore the third surface metal reflector/electrode of the present invention provides an electrochromic mirror with a superior viewing image.

Finally, a third surface metal reflector/electrode improves the ability to reduce double imaging in an electrochromic mirror. As stated above, there are several interfaces where reflections can occur. Some of these reflections can be significantly reduced with color suppression or anti-reflective coatings; however, the most significant "double imaging" reflections are caused by misalignment of the first surface and the surface containing the reflector, and the most reproducible way of minimizing the impact of this reflection is by ensuring both glass elements are parallel. Presently, convex glass is often used for the passenger side and aspheric glass is sometimes used for the driver side mirror to increase the field of view and reduce potential blind spots. However, it is difficult to reproducibly bend successive elements of glass having identical radii of curvature. Therefore, when building an electrochromic mirror the front glass element and the rear glass element may not be perfectly parallel (do not have identical radii of curvature) and, therefore, the otherwise controlled double imaging problems become much more pronounced. By incorporating a combined reflector electrode on the third surface of the device in accordance with the present invention, light does not have to travel through the rear glass element before being reflected, and any double imaging that occurs from the elements being out of parallel will be significantly reduced.

It is desirable in the construction of outside rearview mirrors to incorporate thinner glass in order to decrease the overall weight of the mirror so that the mechanisms used to manipulate the orientation of the mirror are not overloaded. Decreasing the weight of the device also improves the dynamic stability of the mirror assembly when exposed to vibrations. Heretofore, no electrochromic mirrors incorporating a solution-phase electrochromic medium and two thin glass elements have been commercially available because thin glass suffers from being flexible and prone to warpage or breakage, especially when exposed to extreme environments. This problem is substantially improved by using an improved electrochromic device incorporating two thin glass elements having an improved gel material. This improved device is disclosed in commonly assigned U.S. Patent Application entitled "AN ELECTROCHROMIC MIRROR WITH TWO THIN GLASS ELEMENTS AND A GELLED ELECTROCHROMIC MEDIUM", filed on or about Apr. 2, 1997. The entire disclosure, including the references contained therein, of this U.S. Patent Application is hereby incorporated herein by reference. The addition of the combined reflector/electrode onto the third surface of the device further helps remove any residual double imaging resulting from the two glass elements being out of parallel.

The most important factors for obtaining a reliable electrochromic mirror having a third surface reflector/electrode 120 are that the reflector/electrode have sufficient reflectance and that the mirror incorporating the reflector/electrode have adequate operational life. Regarding reflectance, the auto manufacturer's require a highly reflective mirror for the inside mirror having a minimum reflectivity of at least 70 percent, whereas the reflectivity requirements for an outside mirrors are less stringent and generally must be at least 50 percent. To produce an electrochromic mirror with 70% reflectance the reflector must have a higher reflectance because having the electrochromic medium in contact with the reflector will reduce the reflectance from that interface as compared to having the reflector in air due to the medium having a higher index of refraction as compared to air. Also, the glass, the transparent electrode and the electrochromic medium even in its clear state are slightly light absorbing. Typically, if a overall reflectance of 70% is desired, the reflector must have a reflectance of about 80%. Therefore, highly reflectance in the context of the present invention means a reflector whose reflectance in air is at least 80%.

Regarding operational life, the layer or layers that comprise the reflector/electrode 120 must have adequate bond strength to the peripheral seal, the outermost layer must have good shelf life between the time it is coated and the time the mirror is assembled, the layer or layers must be resistant to atmospheric and electrical contact corrosion, and must bond well to the glass surface or to other layers disposed beneath it, e.g., the base or intermediate layer (122 or 123, respectively). The overall sheet resistance for the reflector/electrode 120 may range from about 0.01 Ω/□ to about 20 Ω/□ and preferably ranges from about 0.2 Ω/□ to about 6 Ω/□. As will be discussed in more detail below, improved electrical interconnections using a portion of the third surface reflector/electrode as a high conductance contact or buss bar for the second surface transparent conductive electrode may be utilized when the conductance of the third surface reflector/electrode is below about 2 Ω/□.

Referring to FIG. 3 for one embodiment of the present invention, a reflector/electrodes that is made from a single layer of a highly reflective silver alloy 121 is provided that is in contact with at least one solution-phase electrochromic material. The layer of silver alloy covers the entire third surface 114a of second element 114, provided that a section of the reflector/electrode may be removed for a display device and a glare sensor, in accordance with U.S. Patent Application entitled "AN INFORMATION DISPLAY AREA ON ELECTROCHROMIC MIRRORS HAVING A THIRD SURFACE REFLECTOR" and filed on or about Apr. 2, 1997. This application is hereby incorporated in its entirety herein by reference. The highly reflective silver alloy means a homogeneous or non-homogeneous mixture of silver and one or more metals, or an unsaturated, saturated or supersaturated solid solution of silver and one or more metals. The thickness of highly reflective layer 121 ranges from about 50 Å to about 2000 Å and more preferably from about 200 Å to about 1000 Å. If highly reflective layer 121 is disposed directly to the glass surface, it is preferred that the glass surface be treated by plasma discharge to improve adhesion.

Table 1 shows the relevant properties for a number of different metals that have been proposed for third surface reflectors as compared with the materials suitable for the reflector/electrode 120 of the present invention. The only materials in Table 1 having reflectance properties suitable for use as a third surface reflector/electrode in contact with at least one solution-phase electrochromic material for an inside electrochromic mirror for a motor vehicle are aluminum, silver, and silver alloys. Aluminum performs very poorly when in contact with solution-phase material(s) in the electrochromic medium because aluminum reacts with or is corroded by these materials. The reacted or corroded aluminum is non-reflective and non-conductive and will typically dissolve off, flake off or delaminate from the glass surface. Silver is more stable than aluminum but can fail when deposited over the entire third surface because it does not have long shelf life and is not resistant to electrical contact corrosion when exposed to the environmental extremes found in the motor vehicle environment. These environmental extremes include temperatures ranging from about −40° C. to about 85° C., and humidities ranging from about 0 percent to about 100 percent. Further, mirrors must survive at these temperatures and humidities for coloration cycle lives up to 100,000 cycles. The other prior art materials (silver/copper, chromium, stainless steel, rhodium, platinum, palladium, Inconel®, copper or titanium) suffer from any one of a number of deficiencies such as: very poor color neutrality (silver/copper and copper); poor reflectance (chromium, stainless steel, rhodium, platinum, palladium, Inconel®, and titanium); or poor cleanability (chromium).

When silver is alloyed with certain materials to produce a third surface reflector/electrode the deficiencies associated with silver metal and aluminum metal can be overcome. Suitable materials for the reflective layer are alloys of silver/palladium, silver/gold, silver/platinum, silver/rhodium, silver/titanium, etc. The amount of the solute material, i.e., palladium, gold, etc., can vary. As can be seen from Table 1, the silver alloys surprisingly retain the high reflectance and low sheet resistance properties of silver, while simultaneously improving their contact stability, shelf life and also increasing their window of potential stability when used as electrodes in propylene carbonate containing 0.2 molar tetraethylammonium tetrafluoroborate. The presently preferred materials for highly reflective layer 121 are Ag/Au, Ag/Pt and Ag/Pd.

More typically, reflector/electrode 120 has, in addition to the layer of a highly reflective alloy 121, an optional base layer of a conductive metal or alloy 122 deposited directly on the third surface 114a. There may also be an optional intermediate layer of a conductive metal or alloy 123 disposed between the layer of highly reflective material 121 and the base coat 122. If reflector/electrode 120 includes more than one layer there should not be galvanic corrosion between the two metals or alloys. If optional base layer 122 is deposited between the highly reflective layer 121 and the glass element 114, it should be environmentally rugged, e.g., bond well to the third (glass) surface 114a and to highly reflective layer 121, and maintain this bond when the seal 116 is bonded to the reflective layer. Base layer 122 should have a thickness from about 50 Å to about 2000 Å and more preferably from about 100 Å to about 1000 Å. Suitable materials for the base layer 122 are chromium, stainless steel, titanium, and alloys of chromium/molybdenum/nickel, molybdenum and nickel-based alloys (commonly referred to as Inconel®, available from Castle Metals, Chicago, Ill.). The main constituents of Inconel® are nickel which may range from 52% to 76% (Inconel® 617 and 600, respectfully), iron which may range from 1.5% to 18.5% (Inconel®617 and Inconel®718, respectfully) and chromium which may range from 15% to 23% (Inconel®600 and Inconel® 601, respectfully). Inconel®617 having 52% nickel, 1.5% iron, 22% chromium, and typical "other" constituents including 12.5% cobalt, 9.0% molybdenum and 1.2% aluminum was used in the present examples.

In some instances it is desirable to provide an optional intermediate layer 123 between the highly reflective layer 121 and the base layer 122 in case the material of layer 121 does not adhere well to the material of layer 122 or there are any adverse interactions between the materials, e.g., galvanic corrosion. If used, intermediate layer 123 should exhibit environmental ruggedness, e.g., bond well to the e.g., 1.2 V, that the silver alloy reflector/electrode could safely be used as the anode in contact with at least one solution-phase electrochromic material.

TABLE 1

| Metal | White Light Reflectance In Air | Reflectance In Device (%) | Contact Stability | Negative Potential Limit of Window of Potential Stability (V) | Positive Potential Limit Window of Potential Stability (V) |
|---|---|---|---|---|---|
| Al | >92 | N/A | very poor | N/A | N/A |
| Cr | 65 | N/A | poor | N/A | N/A |
| Stainless Steel | 60 | N/A | good | N/A | N/A |
| Rh | 75 | N/A | very good | N/A | N/A |
| Pt | 72 | N/A | very good | N/A | N/A |
| Inconel | 55 | N/A | N/A | N/A | N/A |
| Ag | 97 | 84 | fair | −2.29 | 0.86 |
| Ag2.7Pd | 93 | 81 | good | −2.26 | 0.87 |
| Ag10Pd | 80 | 68 | good | −2.05 | 0.97 |
| Ag6Pt | 92 | 80 | good | 1.66* | 0.91 |
| Ag6Au | 96 | 84 | good | −2.25 | 0.98 |
| Ag15Au | 94 | 82 | good | −2.3 | 1.2 |

*This number is suspect because the test was run in propylene carbonate containing some water.

base layer 122 and to the highly reflective layer 121, and maintain this bond when the seal member 116 is bonded to the highly reflective layer 121. The thickness of intermediate layer 123 ranges from about 50 Å to about 2000 Å and more preferably from about 100 Å to about 1000 Å. Suitable materials for the optional intermediate layer 123 are molybdenum, rhodium, stainless steel, titanium, copper, nickel and platinum. Reference is made to examples 1 and 2 to show how the insertion of a rhodium intermediate layer between a chromium base layer and a silver or silver alloy reflective layer increases the time to failure in copper-accelerated acetic acid-salt spray (CASS) by a factor of 10. Example 4 shows how the insertion of a molybdenum intermediate layer between a chromium base layer and a silver alloy having a molybdenum flash over-coat layer increases the time to failure in CASS by a factor of 12.

Finally, it is sometimes desirable to provide an optional flash over-coat 124 over highly reflective layer 121 such that it (and not the highly reflective layer 121) contacts the electrochromic medium. This flash over-coat layer 124 must have stable behavior as an electrode, it must have good shelf life, it must bond well to the highly reflective layer 121 and maintain this bond when the seal member 116 is bonded thereto. It must be sufficiently thin such that it does not completely block the reflectivity of highly reflective layer 121. In accordance with another embodiment of the present invention, when a very thin flash over-coat 124 is placed over the highly reflecting layer, then the highly reflective layer 121 may be silver metal or a silver alloy because the flash layer protects the highly reflective layer while still allowing the highly reflecting layer 121 to contribute to the reflectivity of the mirror. In such cases a thin (between about 25 Å and about 300 Å) layer of rhodium, platinum or molybdenum is deposited over the highly reflective layer 121.

It is preferred but not essential that the third surface reflector/electrode 120 be maintained as the cathode in the circuitry because this eliminates the possibility of anodic dissolution or anodic corrosion that might occur if the reflector/electrode was used as the anode. Although as can be seen in the Table, if certain silver alloys are used the positive potential limit of stability extends out far enough, The various layers of reflector/electrode 120 can be deposited by a variety of deposition procedures, such as RF and DC sputtering, e-beam evaporation, chemical vapor deposition, electrodeposition, etc., that will be known to those skilled in the art. The preferred alloys are preferably deposited by sputtering (RF or DC) a target of the desired alloy or by sputtering separate targets of the individual metals that make up the desired alloy such that the metals mix during the deposition process and the desired alloy is produced when the mixed metals deposit and solidify on the substrate surface.

Figure 4:
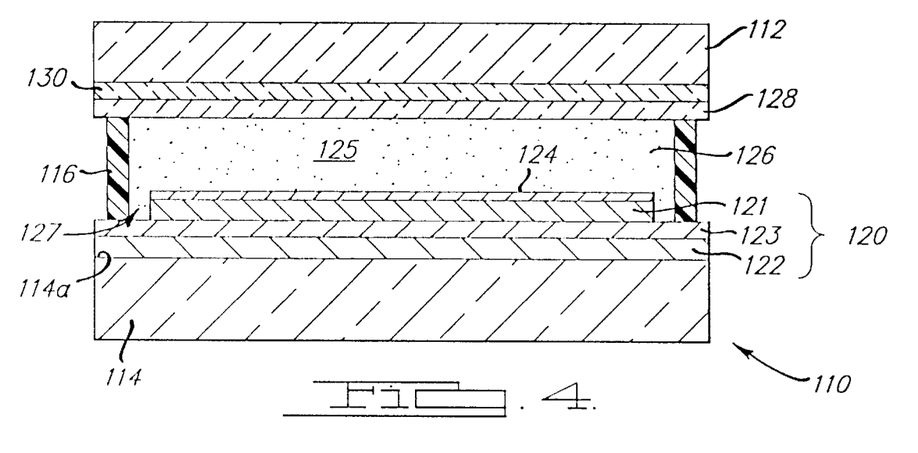
FIG. 4 is an enlarged cross-sectional view of an electrochromic mirror incorporating an alternate embodiment of a third surface reflector/electrode according to the present invention.

In another embodiment, the reflector/electrode 120, shown in FIG. 4, has at least two layers (121 and 122) where at least one layer of a base material 122 covers the entire portion of the third surface 114a (except for sections removed for a display device and a glare sensor in accordance with the U.S. Patent Application entitled "AN INFORMATION DISPLAY AREA ON ELECTROCHROMIC MIRRORS HAVING A THIRD SURFACE REFLECTOR") and at least one layer of a highly reflective material 121 covers the inner section of the third surface 114a but does not cover the peripheral edge portion 125 where seal member 116 is disposed. Peripheral portion 125 may be created by masking that portion of layer 122 during deposition of the layer of highly reflective material 121, or the layer of highly reflective material may be deposited over the entire third surface and subsequently removed or partially removed in the peripheral portion. The masking of layer 122 may be accomplished by use of a physical mask or through other well known techniques such as photolithography and the like. Alternatively, layer 122 may be partially removed in the peripheral portion by a variety of techniques, such as, for example, by etching (laser, chemical or otherwise), mechanical scraping, sandblasting or otherwise. Laser etching is the presently preferred method because of its accuracy, speed and control. Partial removal is preferably accomplished by laser etching in a pattern where enough metal is removed to allow the seal member 116 to bond directly to the third surface 114a while leaving enough metal in this area such that the conductance in this area is not significantly reduced. For example, the metal may be removed in a dot pattern or other pattern as taught for removal of metal for information display in the immediately above-referenced U.S. Patent Application.

In addition, an optional intermediate layer of a conductive material 123 may be placed over the entire area of third surface 114a and disposed between the highly reflective layer 121 and the base layer 122, or it may be placed only under the area covered by layer 121, i.e., not in peripheral edge portion 125. If this optional intermediate layer is utilized, it can cover the entire area of third surface 114a or it may be masked or removed from peripheral edge portion as discussed above.

An optional flash over-coat layer 124 may be coated over the highly reflective layer 121. The highly reflective layer 121, the optional intermediate layer 123 and the base layer 122 preferably have properties similar to that described above, except that the layer of highly reflective material 121 need not bond well to the epoxy seal since it is removed in the peripheral portion where seal member is 116 placed. Because the interaction with the epoxy seal is removed, silver metal itself, in addition to the alloys of silver described above, will function as the highly reflective layer.

Referring again to FIG. 3, chamber 125, defined by transparent conductor 128 (disposed on front element rear surface 112b), reflector/electrode 120 (disposed on rear element front surface 114a), and an inner circumferential wall 132 of sealing member 116, contains an electrochromic medium 126. Electrochromic medium 126 is capable of attenuating light traveling therethrough and has at least one solution-phase electrochromic material in intimate contact with reflector/electrode 120 and at least one additional electroactive material that may be solution-phase, surface-confined, or one that plates out onto a surface. However, the presently preferred media are solution phase redox electrochromics, such as those disclosed in above-referenced U.S. Pat. Nos. 4,902,108; 5,128,799, 5,278,693; 5,280,380; 5,282,077; 5,294,376; 5,336,448. Co-filed U.S. Patent Application entitled "AN IMPROVED ELECTROCHROMIC MEDIUM CAPABLE OF PRODUCING A PRE-SELECTED COLOR" discloses electrochromic media that are perceived to be gray throughout their normal range of operation. The entire disclosure of this Application is hereby incorporated herein by reference. If a solution-phase electrochromic medium is utilized, it may be inserted into chamber 125 through a sealable fill port 142 through well known techniques, such as vacuum backfilling and the like.

A resistive heater 138, disposed on the fourth glass surface 114b, may optionally be a layer of ITO, fluorine-doped tin oxide, or may be other heater layers or structures well known in the art. Electrically conductive spring clips 134a and 134b are placed on the coated glass sheets (112 and 114) to make electrical contact with the exposed areas of the transparent conductive coating 128 (clip 134b) and the third surface reflector/electrode 120 (clip 134a). Suitable electrical conductors (not shown) may be soldered or otherwise connected to the spring clips (134a and 134b) so that a desired voltage may be applied to the device from a suitable power source.

An electrical circuit 150, such as those taught in the above-referenced Canadian Patent No. 1,300945 and U.S. Pat. Nos. 5,204,778; 5,434,407; and 5,451,822, is connected to, and allows control of the potential to be applied across, reflector/electrode 120 and transparent electrode 128 such that electrochromic medium 126 will darken and thereby attenuate various amounts of light traveling therethrough and thus vary the reflectance of the mirror containing electrochromic medium 126.

Figure 5B:
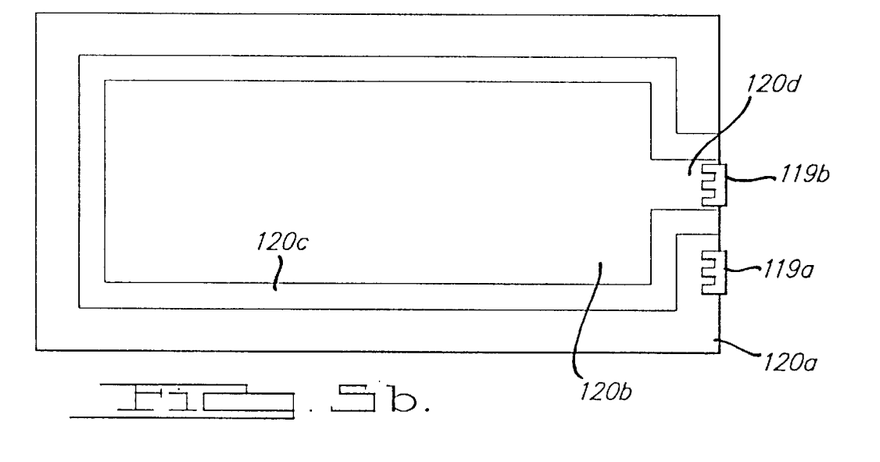

As stated above, the low resistance of reflector/electrode 120 allows greater design flexibility by allowing the electrical contact for the third surface reflector/electrode to be small while maintaining adequate coloring speed. This flexibility extends to improving the interconnection techniques to the layer of transparent conductive material 128 on the second surface 112b. Referring now to FIGS. 5a and 5b, an improved mechanism for applying a drive potential to the layer of transparent conductive material 128 is shown. Electrical connection between the power supply and the layer of transparent conductive material 128 is made by connecting the buss bars (or clips 119a) to the area of reflector/electrode 120a such that the drive potential travels through the area of reflector/electrode 120a and the conductive particles 116b in sealing member 116 before reaching the transparent conductor 128. Reflector/electrode must not be present in area 120c so that there is no chance of current flow from reflector/electrode area 120a to 120b. This configuration is advantageous in that it allows connection to the transparent conductive material 128 nearly all the way around the circumference and therefore improves the speed of dimming and clearing of the electrochromic media 126.

In such a configuration, sealing member 116 comprises a typical sealing material, e.g., epoxy 116a, with conductive particles 116b contained therein. The conductive particles may be small, such as, for example, gold, silver, copper, etc., coated plastic with a diameter ranging from about 5 microns to about 80 microns, in which case there must be a sufficient number of particles to ensure sufficient conductivity between the reflector/electrode area 120a and the transparent conductive material 128. Alternatively, the conductive particles may be large enough to act as spacers, such as, for example, gold, silver, copper, etc., coated glass or plastic beads. The reflector/electrode 120 is separated into two distinct reflector/electrode areas (120a and 120b, separated by an area 120c devoid of reflector/electrode). There are many methods of removing the reflector/electrode 120 from area 120c, such as, for example, chemical etching, laser ablating, physical removal by scraping, etc. Deposition in area 120c can also be avoided by use of a mask during deposition of reflector/electrode. Sealing member 116 with particles 116b contacts area 120a such that there is a conductive path between reflector/electrode area 120a and the layer of transparent conductive material 128. Thus, electrical connection to the reflector/electrode area 120b that imparts a potential to the electrochromic medium is connected through clips 119b to the electronic circuitry at reflector/electrode area 120d (FIG. 5b). No conductive particles 116b can be placed in this reflector/electrode area 120b because of the possibility of an electrical short between reflector/electrode area 120b and the layer of transparent conductive material 128. If such an electrical short occurred the electrochromic device would not operate properly. Additionally, no conductive seal 116b should be present in area 120d.

A variety of methods can be used to ensure that no conductive particles 116b enter into this reflector/electrode area 120b, such as, for example, disposing a nonconductive material into the area 120c of reflector/electrode devoid of conductive material. A dual dispenser could be used to deposit the seal 116 with conductive particles 116b onto reflector/electrode area 120a and simultaneously deposit the nonconductive material into reflector/electrode area 120c. Another method would be to cure a nonconductive seal in area 120c and then dispose a conductive material 116c into the edge gap to electrically interconnect reflector/electrode area 120a with transparent conductive layer 128. A general method of ensuring that no conductive particles reach reflector/electrode area 120b is to make sure seal 116 has proper flow characteristics such that the conductive portion 116b tents to stay behind as the sealant is squeezed out during assembly and only the non-conductive portion of 116 flows into area 120b. In an alternative embodiment, spacer member 116 need not contain conductive particles and a conductive member or material 116c may be placed on or in the outer edge of member 116 to interconnect transparent conductive material 128 to reflector/electrode area 120a.

Figure 6:
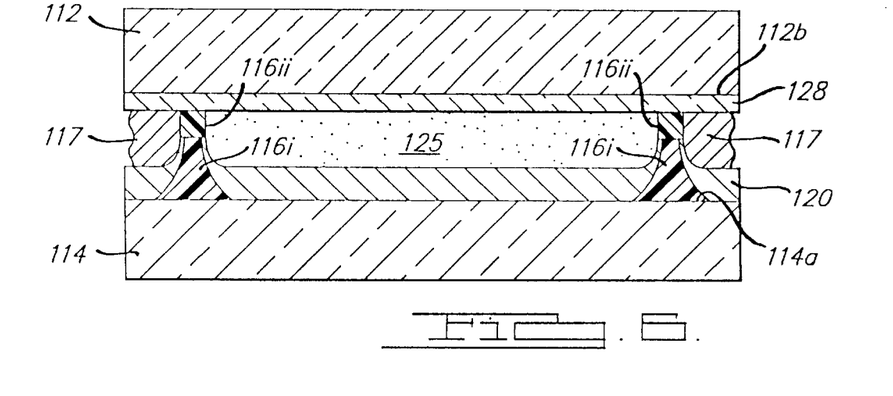
FIG. 6 is an enlarged cross-sectional view of an electrochromic mirror using a cured and machine-milled epoxy seal to hold the transparent elements in a spaced-apart relationship.

Yet another embodiment of an improved electrical interconnection technique is illustrated in FIG. 6 where a first portion of seal member 116 is applied directly onto the third surface 114a and cured prior to the application of reflector/electrode 120. After the reflector/electrode 120 is deposited onto the third surface 114a over the first portion of seal member 116, a portion of the cured seal member 116 is machined off to leave 116i as shown with a predetermined thickness (which will vary depending on the desired cell spacing between the second surface 112b and the third surface 114a). The cell spacing ranges from about 20 microns to about 400 microns, and preferably range from about 90 microns to about 230 microns. By curing the first portion of seal member and machining it to a predetermined thickness (116i) the need for glass beads to ensure a constant cell spacing is eliminated. Glass beads are useful to provide cell spacing, however, they provide stress points where they contact reflector/electrode 120 and transparent conductor 128. By removing the glass beads these stress points are also removed. During the machining, the reflector/electrode 120 that is coated on first portion of seal member 116 is removed to leave an area devoid of reflector/electrode 120. A second portion of seal member 116ii is then deposited onto the machined area of the first portion of seal member 116i or on the coatings on second surface 112b in the area corresponding to 116i, and seal member 116ii is cured after assembly in a conventional manner. Finally, an outer conductive seal member 117 may optionally be deposited on the outer peripheral portion of seal member 116 to make electrical contact between the outer edge of reflector/electrode 120 and the outer peripheral edge of the layer of transparent conductive material 128. This configuration is advantageous in that it allows connection to the transparent conductive material 128 nearly all the way around the circumference and therefore improves the speed of dimming and clearing of the electrochromic media 126.

Referring again to FIG. 2, rearview mirrors embodying the present invention preferably include a bezel 144, which extends around the entire periphery of each individual assembly 110, 111a and/or 111b. The bezel 144 conceals and protects the spring clips 134a and 134b of FIG. 3, (or 116a and 116b of FIG. 5a, 116i, 116ii and 117 of FIG. 6) and the peripheral edge portions of sealing member and both the front and rear glass elements (112 and 114, respectively). A wide variety of bezel designs are well known in the art, such as, for example the bezel taught and claimed in above-referenced U.S. Pat. No. 5,448,397. There are also a wide variety of housing well known in the art for attaching the mirror assembly 110 to the inside front windshield of an automobile, or for attaching the mirror assemblies 111a and 111b to the outside of an automobile. A preferred mounting bracket is disclosed in above-referenced U.S. Pat. No. 5,337,948.

The electrical circuit preferably incorporates an ambient light sensor (not shown) and a glare light sensor 160, the glare light sensor being positioned either behind the mirror glass and looking through a section of the mirror with the reflective material completely or partially removed, or the glare light sensor can be positioned outside the reflective surfaces, e.g., in the bezel 144. Additionally, an area or areas of the electrode and reflector, such as 146, may be completely removed, or partially removed in, for example, a dot or line pattern, to permit a vacuum fluorescent display, such as a compass, clock, or other indicia, to show through to the driver of the vehicle. Above-referenced co-filed U.S. Patent Application entitled "AN INFORMATION DISPLAY AREA ON ELECTROCHROMIC MIRRORS HAVING A THIRD SURFACE REFLECTOR" shows a presently preferred line pattern. The present invention is also applicable to a mirror which uses only one video chip light sensor to measure both glare and ambient light and which is further capable of determining the direction of glare. An automatic mirror on the inside of a vehicle, constructed according to this invention, can also control one or both outside mirrors as slaves in an automatic mirror system. The following illustrative examples are not intended to limit the scope of the present invention but to illustrate its application and use:

EXAMPLE 1

Electrochromic mirror devices incorporating a high reflectivity third surface reflector/electrode were prepared by sequentially depositing approximately 700 angstroms of chromium and approximately 500 angstroms of silver on the surface of 2.3 millimeter thick sheets of flat soda lime float glass cut to an automotive mirror element shape. A second set of high reflectivity third surface reflector/electrodes were also prepared by sequentially depositing 700 angstroms of chromium and approximately 500 angstroms of a silver alloy containing 3% by weight palladium on the glass element shapes. The deposition was accomplished by passing the said glass element shapes past separate metal targets in a magnetron sputtering system with a base pressure of $3\times10^{-6}$ torr and an argon pressure of $3\times10^{-3}$ torr.

The chromium/silver and chromium/silver 3% palladium alloy coated glass automotive mirror shapes were used as the rear planar elements of an electrochromic mirror device. The front element was a sheet of TEC 15 transparent conductor coated glass from LOF cut similar in shape and size to the rear glass element. The front and rear elements were bonded together by an epoxy perimeter seal with the conductive planar surfaces facing each other and parallel to each other with an offset. The spacing between the electrodes was about 137 microns. The devices were vacuum filled through a fill port left in the perimeter seal with an electrochromic solution made up of:

0.028 molar 5,10-dihydro-5-10-dimethylphenazine 0.034 molar 1,1'-di(3-phenyl(n-propane))-4,4'-bipyridinium di(tetrafluoroborate)

0.030 molar 2-(2'-hydroxy-5'-methylphenyl)-benzotriazole in a solution of 3 weight percent Elvacite™ 2051 polymethylmethacrylate resin dissolved in propylene carbonate.

The fill port was plugged with a UV cure adhesive which was cured by exposure to UV light.

The devices were subjected to accelerated durability tests until the seal integrity of the device was breached or the lamination of the reflector/electrode layers or the transparent electrode layers were substantially degraded or dilapidated at which time the said device is said to fail. The first test performed was steam autoclave testing in which the devices were sealed in a water containing vessel and subjected to 120 degrees centigrade at a pressure of 15 pounds per square inch (psi). The second test performed was copper-accelerated acetic acid-salt spray (CASS) as described in ASTM B 368-85.

When the electrochromic devices were observed after one day in testing, all of the devices failed to withstand the CASS testing and all of the devices failed to withstand the steam autoclave testing.

EXAMPLE 2

Other than as specifically mentioned, the devices in this example were constructed in accordance with the conditions and teachings in example 1. Multilayer combination reflector/electrodes were prepared by sequentially depositing approximately 700 angstroms chromium, approximately 100 angstroms rhodium and approximately 500 angstroms of silver on the surface of said glass element shapes. A second set of multilayer combination reflector/electrodes were also prepared by sequentially depositing approximately 700 angstroms of chromium, approximately 100 angstroms rhodium and approximately 500 angstroms of a silver alloy containing 3% by weight palladium on the surface of said glass element shapes. The electrochromic devices were constructed and tested in accordance with example 1.

The device incorporating the sequential multilayer combination reflector electrode of chromium, rhodium and silver withstood steam autoclave testing two times longer and CASS testing 10 times longer than device in example 1 before failure occurred. The device incorporating the sequential multilayer combination reflector electrode of chromium, rhodium and silver 3% palladium alloy withstood steam autoclave testing three times longer and CASS testing 10 times longer than devices in example 1 before failure occurred.

EXAMPLE 3

Other than as specifically mentioned, the devices in this example were constructed in accordance with the conditions and teachings in example 1. Multilayer combination reflector/electrodes were prepared by sequentially depositing approximately 700 angstroms chromium, approximately 500 angstroms molybdenum and approximately 500 angstroms of a silver alloy containing 3% by weight palladium on the surface of said glass element shapes. The electrochromic devices were constructed and tested in accordance with example 1.

The device incorporating the sequential multilayer combination reflector electrode of chromium, molybdenum and silver 3% palladium alloy withstood CASS testing 10 times longer than devices in example 1 before failure occurred.

EXAMPLE 4

Other than as specifically mentioned, the devices in this example were constructed in accordance with the conditions and teachings in example 1. Multilayer combination reflector/electrodes were prepared by sequentially depositing approximately 700 angstroms chromium, approximately 500 angstroms of a silver alloy containing 3% by weight palladium and approximately 100 angstroms of molybdenum on the surface of said glass element shapes. A second set of multilayer combination reflector/electrodes were also prepared by sequentially depositing approximately 700 angstroms of chromium, approximately 500 angstroms molybdenum, approximately 500 angstroms of a silver alloy containing 3% by weight palladium and approximately 100 angstroms of molybdenum on the surface of said glass element shapes. The electrochromic devices were constructed and tested in accordance with example 1.

The device incorporating the sequential multilayer combination reflector electrode of chromium, molybdenum, silver 3% palladium, molybdenum withstood steam autoclave testing 25% longer and CASS testing twelve times longer than the sequential multilayer combination reflector electrode device of chromium, silver 3% palladium, molybdenum before failure occurred. Also, the device incorporating the sequential multilayer combination reflector electrode of chromium, molybdenum, silver 3% palladium, molybdenum withstood CASS testing three times longer than the device constructed in example 3. Finally, the sequential multilayer combination reflector electrode device of chromium, silver 3% palladium, molybdenum withstood two times longer in CASS testing and twenty times longer in steam autoclave testing than the sequential multilayer combination reflector electrode device of chromium, silver 3% palladium of example 1.

EXAMPLE 5

Other than as specifically mentioned, the devices in this example were constructed in accordance with the conditions and teachings in example 1. Multilayer combination reflector/electrodes were prepared by sequentially depositing approximately 700 angstroms chromium, approximately 100 angstroms rhodium and approximately 500 angstroms of silver on the surface of said glass element shapes. A second set of multilayer combination reflector/electrodes were also prepared by sequentially depositing approximately 700 angstroms of chromium, approximately 100 angstroms rhodium and approximately 500 angstroms of a silver alloy containing 3% by weight palladium on the surface of said glass element shapes. A third set of multilayer combination reflector/electrodes were also prepared by sequentially depositing approximately 700 angstroms of chromium, approximately 100 angstroms rhodium and approximately 500 angstroms of a silver alloy containing 6% by weight platinum on the surface of said glass element shapes. A fourth set of multilayer combination reflector/ electrodes were also prepared by sequentially depositing approximately 700 angstroms of chromium, approximately 100 angstroms rhodium and approximately 500 angstroms of a silver alloy containing 6% by weight gold on the surface of said glass element shapes. A fifth set of multilayer combination reflector/electrodes were also prepared by sequentially depositing approximately 700 angstroms of chromium, approximately 100 angstroms rhodium and approximately 500 angstroms of a silver alloy containing 15% by weight gold on the surface of said glass element shapes. The electrochromic devices were constructed in accordance with example 1.

Conductive clips were connected to the offset portions of the front and rear elements of the devices. A power source was connected to the clips and 1.2 volts was applied to the devices continuously for approximately 250 hours at approximately 20 degrees Celsius, with the connection arranged such that the reflector/electrode was the cathode. The device incorporating the sequential multilayer combination reflector electrode of chromium, rhodium and silver exhibited a yellowing effect within the electrochromic medium. This yellowing phenomenon was not apparent in any of the silver alloy devices.

While the invention has been described in detail herein in accordance with certain preferred embodiments thereof, many modifications and changes therein may be effected by those skilled in the art without departing from the spirit of the invention. Accordingly, it is our intent to be limited only by the scope of the appending claims and not by way of the details and instrumentalities describing the embodiments shown herein.

What is claimed is:

1. An electrochromic variable reflectance mirror for automotive vehicles, comprising front and rear spaced elements, each having front and rear surfaces, said rear surface of said front element having a layer of transparent conductive material disposed thereon, said front surface of said rear element having a reflector/electrode including at least a layer of highly reflective silver alloy, where said front and rear spaced elements are sealably bonded together in a spaced-apart relationship to define a chamber, where said chamber contains at least one solution-phase electrochromic material in contact with said reflector/electrode, and where said reflector/electrode is effective to reflect light through said medium and said front element when said light reaches said reflector/electrode after passing through said front element and said at least one electrochromic material.

2. The mirror according to claim 1, where the silver alloy is a combination of silver and an element selected from the group consisting essentially of gold, platinum, rhodium, and palladium.

3. The mirror according to claim 1, where said reflector/electrode comprises a plurality of layers.

4. The mirror according to claim 3, where said reflector/electrode further includes a base layer disposed beneath said highly reflective alloy.

5. The mirror according to claim 4, where said base layer comprises a material selected from the group consisting essentially of: chromium; chromium-molybdenum-nickel alloys; nickel-iron-chromium alloys; stainless steel; and titanium.

6. The mirror according to claim 5, where said reflector/electrode further includes at least one intermediate layer disposed between said highly reflective alloy and said base layer, where said intermediate layer comprises a material selected from the group consisting essentially of: molybdenum; rhodium; stainless steel; and titanium.

7. The mirror according to claim 6, where said reflector/electrode further includes at least one flash over-layer disposed over said highly reflective layer, where said flash over-layer comprises a material selected from the group consisting essentially of: rhodium, molybdenum, and platinum.

8. The mirror according to claim 1, where said layer of transparent conductive material has a sheet resistance ranging from about 0.1 ohms per square to about 40 ohms per square.

9. The mirror according to claim 8, where the sheet resistance of said transparent conductor ranges from about 0.5 ohms per square to about 15 ohms per square.

10. An electrochromic variable reflectance mirror for automotive vehicles, comprising front and rear spaced elements, each having front and rear surfaces, said rear surface of said front element having a layer of transparent conductive material disposed thereon, said front surface of said rear element having a reflector/electrode including at least a layer of highly reflective material and a flash over-coat layer, where said front and rear spaced elements are sealably bonded together in a spaced-apart relationship to define a chamber, where said chamber contains at least one solution-phase electrochromic material in contact with said flash layer, and where said reflector/electrode is effective to reflect light through said medium and said front element when said light reaches said reflector/electrode after passing through said front element and said at least one electrochromic material.

11. The mirror according to claim 10, where said highly reflective material is a material selected from the group consisting of silver and silver alloys, where the silver alloy is a combination of silver and an element selected from the group consisting essentially of gold, platinum, rhodium, and palladium.

12. The mirror according to claim 11, where said reflector/electrode further includes a base layer disposed beneath said highly reflective alloy.

13. The mirror according to claim 12, where said base layer comprises a material selected from the group consisting essentially of: chromium; chromium-molybdenum-nickel alloys; nickel-iron-chromium alloys; stainless steel; and titanium.

14. The mirror according to claim 11, where said reflector/electrode further includes at least one intermediate layer disposed between said highly reflective alloy and said base layer, where said intermediate layer comprises a material selected from the group consisting essentially of: molybdenum; rhodium; stainless steel; and titanium.

15. The mirror according to claim 10 where said flash over-layer comprises a material selected from the group consisting essentially of: rhodium, molybdenum, and platinum.

16. An electrochromic variable reflectance mirror for automotive vehicles, comprising front and rear spaced elements, each having front and rear surfaces, said rear surface of said front element having a layer of transparent conductive material disposed thereon, said front surface of said rear element having a reflector/electrode comprising a base layer covering the entire portion of said front surface of said rear element and at least one additional layer covering an inner portion of said front surface of said rear element, said at least one additional layer including a layer of a highly reflective material, where said front and rear spaced elements are sealably bonded together in a spaced-apart relationship to define a chamber, where said chamber contains at least one solution-phase electrochromic material in contact with said reflector/electrode, and where said reflector/electrode is effective to reflect light through said medium and said front element when said light reaches said reflector/electrode after passing through said front element and said at least one electrochromic material.

17. The mirror according to claim 16, where said highly reflective material is a material selected from the group consisting of silver and silver alloys, where the silver alloy is a combination of silver and an element selected from the group consisting essentially of gold, platinum, rhodium, and palladium.

18. The mirror according to claim 16, where said base layer comprises a material selected from the group consisting essentially of: chromium; chromium-molybdenum-nickel alloys; nickel-iron-chromium alloys; stainless steel; and titanium.

19. The mirror according to claim 16, where said reflector/electrode further includes at least one intermediate layer disposed between said highly reflective alloy and said base layer, where said intermediate layer comprises a material selected from the group consisting essentially of: molybdenum; rhodium; stainless steel; titanium; and alloys and combinations thereof.

20. The mirror according to claim 19, where said intermediate layer covers the entire surface of said front surface of said rear element.

21. The mirror according to claim 19, where said intermediate layer covers the inner portion of said front surface of said rear element.

22. The mirror according to claim 16, where said reflector/electrode further includes at least one flash over-layer disposed over said highly reflective layer, where said flash over-layer comprises a material selected from the group consisting essentially of: rhodium, molybdenum, and platinum.

23. The mirror according to claim 16, where said layer of transparent conductive material has a sheet resistance ranging from about 0.1 ohms per square to about 40 ohms per square.

24. The mirror according to claim 16, where the sheet resistance of said transparent conductor ranges from about 0.5 ohms per square to about 15 ohms per square.

25. The mirror according to any of claims 1, 16 and 20, where said reflector/electrode is removed in a peripheral portion.

26. The mirror according to claim 25, where said reflector/electrode is removed by a technique selected from the group consisting of etching, mechanical scraping and sandblasting.

27. An electrochromic variable reflectance mirror for automotive vehicles, comprising front and rear spaced elements, each having front and rear surfaces, said rear surface of said front element having a layer of transparent conductive material disposed thereon, said front surface of said rear element having at least one layer of a reflector/electrode comprising a highly reflective material covering an inner portion of said front surface of said rear element and extending to a small area of an edge thereof, a conductive material disposed on a peripheral portion of said front surface of said rear element separated from said reflector/electrode by an area devoid of reflector/electrode and conductive material, said front and rear spaced elements being bonded together in a spaced-apart relationship to define a chamber by a seal member disposed on said conductive material, where said mirror further includes means for providing electrical interconnection between said conductive material and said transparent conductive material, where said chamber contains at least one solution-phase electrochromic material in contact with said reflector/electrode, and where said reflector/electrode is effective to reflect light through said medium and said front element when said light reaches said reflector/electrode after passing through said front element and said at least one electrochromic material.

28. The mirror according to claim 27, where said interconnection means comprises conductive particles disposed in said seal member.

29. The mirror according to claim 28, where said conductive particles are silver.

30. The mirror according to claim 28, where said conductive particles are beads coated with a conductive material.

31. The mirror according to claim 30, where said conductive beads are coated with one of gold, silver and copper, and are used as spacers.

32. The mirror according to claim 28, where said interconnection means comprises a conductive interconnection material disposed on the outer edge of said seal member.

33. The mirror according to claim 27, where a non-conductive material is disposed on said portion of the front surface of said rear element devoid of said conductive material.

34. An electrochromic variable reflectance mirror for automotive vehicles, comprising front and rear spaced elements, each having front and rear surfaces, said rear surface of said front element having a layer of transparent conductive material disposed thereon, said front surface of said rear element having a cured first portion of a peripheral seal member covered by a reflector/electrode comprising a highly reflective material, where said cured first portion of said seal member is removed to a predetermined thickness such that said reflector/electrode is separated into an inner portion covering an inner portion of said front surface of said rear element and extending to a small area of an edge thereof, and an outer portion separated from said inner portion by said cured first portion of a seal member, where said outer portion of said reflector/electrode is not in electrical contact with said inner portion, said front and rear spaced elements being bonded together, in a spaced-apart relationship to define a chamber, by a second portion of said seal member disposed on said cured first portion of said seal member, where said mirror further includes means for providing electrical interconnection between said outer portion of said reflector/electrode and said transparent conductive material, where said chamber contains at least one solution-phase electrochromic material in contact with said reflector/electrode, and where said reflector/electrode is effective to reflect light through said medium and said front element when said light reaches said reflector/electrode after passing through said front element and said at least one electrochromic material.

35. The mirror according to claim 34, where said interconnection means comprises a conductive interconnection material disposed on the outer edge of said seal member.

36. The mirror according to claim 35, where said conductive interconnection material comprises a material selected from a conductive epoxy and a conductive paint.

* * * * *

UNITED STATES PATENT AND TRADEMARK OFFICE
Certificate

Patent No. 5,818,625                                                         Patented: October 6, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jeffrey A. Forgette, Wyoming, Michigan; Harlan J. Byker, Holland, Michigan; William L. Tonar, Holland, Michigan; Frederick T. Bauer, Holland, Michigan; and David J. Cammenga, Zeeland, Michigan.

Signed and Sealed this Twenty-Second Day of July 2003.

*GEORGIA Y. EPPS*
*Supervisory Patent Examiner*
Art Unit 2873